United States Patent [19]
Jones, Jr.

[11] Patent Number: 5,130,102
[45] Date of Patent: Jul. 14, 1992

[54] CATALYTIC DISTILLATION REACTOR

[75] Inventor: Edward M. Jones, Jr., Houston, Tex.

[73] Assignee: Chemical Research & Licensing Company, Houston, Tex.

[21] Appl. No.: 535,578

[22] Filed: Jun. 11, 1990

[51] Int. Cl.$^5$ .............................................. B01J 8/04
[52] U.S. Cl. .................................... 422/191; 422/193; 422/195; 261/114.1; 261/114.2; 203/DIG. 6
[58] Field of Search ................ 422/191, 193, 195; 261/114.1, 114.2; 203/DIG. 6

[56] References Cited

U.S. PATENT DOCUMENTS

| | | | |
|---|---|---|---|
| 1,858,158 | 5/1932 | Laird | 261/114.1 |
| 2,877,099 | 3/1959 | Bowles | 422/195 |
| 3,307,254 | 12/1981 | Smith, Jr. | 568/697 |
| 3,584,844 | 6/1971 | Papp | 261/114.2 |
| 3,629,478 | 12/1971 | Haunschild | 203/38 |
| 3,634,535 | 1/1972 | Haunschild | 260/677 A |
| 4,089,752 | 5/1978 | Hancock, II | 203/99 |
| 4,215,011 | 7/1980 | Smith, Jr. | 252/426 |
| 4,232,177 | 11/1980 | Smith, Jr. | 585/324 |
| 4,242,530 | 12/1980 | Smith, Jr. | 585/510 |
| 4,250,052 | 2/1981 | Smith, Jr. | 252/426 |
| 4,302,356 | 11/1981 | Smith, Jr. | 252/426 |
| 4,336,407 | 6/1982 | Smith, Jr. | 568/697 |
| 4,439,350 | 3/1984 | Jones, Jr. | 502/527 |
| 4,443,559 | 4/1984 | Smith, Jr. | 502/527 |
| 4,471,154 | 9/1984 | Franklin | 585/864 |
| 4,475,005 | 10/1984 | Paret | 568/697 |
| 4,482,775 | 11/1984 | Smith, Jr. | 585/671 |
| 4,540,831 | 9/1985 | Briggs | 568/697 |
| 4,847,430 | 7/1989 | Quang et al. | 568/697 |
| 4,847,431 | 7/1989 | Nocca et al. | 568/697 |
| 5,013,407 | 5/1991 | Nocca et al. | 202/158 |
| 5,026,459 | 6/1991 | Quang et al. | 202/158 |

FOREIGN PATENT DOCUMENTS 2096603A 10/1981 United Kingdom .

Primary Examiner—Robert J. Warden
Assistant Examiner—Christopher Y. Kim
Attorney, Agent, or Firm—Kenneth H. Johnson

[57] ABSTRACT

To achieve good liquid-vapor contact and at the same time better utilize the heat of reaction in a distillation column reactor a system is provided wherein a reaction tray and distillation tray are "coupled" by a continuous liquid level between the two. A reaction tray, containing the appropriate catalyst, is situated directly below a distillation tray. A vapor riser is provided through the reaction tray as a by-pass which carries the vapor from a lower distillation tray to a vapor distribution area underneath the "coupled" distillation tray. Liquid flows downward through a downcomer by-passing the "coupled" distillation tray, and onto and across the "coupled" reaction tray immersing the catalyst and rises upward, onto and across the "coupled" distillation tray where it is intimately contacted with the rising vapor effecting fractional distillation. Only that vapor produced by the reaction on the reaction tray rises through the catalyst minimizing movement and pressure drop while the heat produced contributes to the distillation. A sufficient vertical distance between the two "coupled" trays is provided to allow disengagement of any catalyst particles which might become entrained in the rising liquid. A screen, if necessary, may also be positioned in the space between the distillation tray and the reaction tray to retain the particulate catalyst below the distillation tray.

19 Claims, 2 Drawing Sheets

CATALYTIC DISTILLATION REACTOR

BACKGROUND OF THE INVENTION

1. Field of the Invention

The present invention relates to a vessel and apparatus for concurrently carrying out reactions and separating the reactants from products by fractional distillation.

2. Related Art

Recently a new method of carrying out catalytic reactions has been developed, wherein the components of the reaction mixture are concurrently separable by fractional distillation. Several systems have been proposed and one commercially successful uses the catalyst as the catalytic distillation structure. Such a system is variously described in U.S. Pat. Nos. 4,215,011; 4,232,177; 4,242,530; 4,250,052; 4,302,356; 4,307,254; 4,336,407; 4,439,350; 4,443,559; and 4,48,775 commonly assigned herewith.

Briefly, the commercial structure described therein comprises a cloth belt with a plurality of pockets spaced along the belt and containing particulate catalyst material. The cloth belt with catalyst filled pockets is wound into a helix about a spacing material such as knitted stainless steel wire mesh, and these "bales" loaded into a distillation column. Additionally, the above cited U.S. Pat. Nos. 4,443,559 and 4,250,052 disclose a variety of catalyst structures for this use. The present invention dispenses with the belts and the bales disclosed therein.

Placing the particulate catalyst loose on standard distillation trays has also been proposed. See, for example, U.S. Pat. No. 4,215,011 and U.K. patent GB 2,096,603 A. The placement of the catalyst in the downcomers of standard distillation columns has been proposed as in U.S. Pat. No. 3,634,535. Fluidization of the catalyst on the trays by the action of the vapor passing through the tray has also been suggested as in U.S. Pat. No. 4,471,154, wherein a fluidized height of the bed is determined, at least in part by the volume of the bed defined by the tray containing the catalyst and a screen, i.e., about 2 to 10 times the height of the settled catalyst bed. Some deficiencies of such fluidized beds were recognized in Chemiker-Zeitung/Chemische Apparatur, vol. 90, no. 13, July 1966 and U.S. Pat. No. 4,215,011. One object of the present invention is to minimize catalyst movement to prevent attrition, so "fluidization" is kept to the minimum.

Since most reactions occur in the liquid phase and vapor flow through the catalyst on trays causes problems such as increased pressure drop and catalyst attrition, vapor by-passes around the catalyst containing trays have been proposed. See for example U.S. Pat Nos. 4,847,430 and 4,847,431. Disclosed therein are alternating catalyst containing trays and standard distillation trays with the vapor from the distillation trays bypassing the catalyst containing trays and passing directly to the next higher distillation tray (U.S. Pat. No. 4,089,752 discloses the by-pass in a non-catalytic reaction distillation system).

In most applications the reaction being carried out is exothermic with the heat of reaction causing partial vaporization of the reaction mixture. The present invention retains the benefits of catalytic distillation (e.g. exothermic heat utilization), but avoids the catalyst bag distillation structures on the one hand and the fluidized bed on the other hand.

SUMMARY OF THE INVENTION

Briefly the invention relates to a distillation column reactor which contains special reaction and distillation trays "coupled" by a continuous liquid level between each "coupled" reaction and distillation tray. The reaction tray has particulate catalysts supported thereon and a vapor by-pass riser to carry the vapor rising from below the "coupled pair" to a vapor distributor underneath the "coupled" distillation tray. The liquid downcomer from a "coupled" distillation tray provides a liquid by-pass around the "coupled" reaction tray downward, e.g. to the next lower reaction tray or to a standard distillation tray.

To achieve good liquid-vapor contact and at the same time better utilize the heat of reaction, a system is provided wherein a reaction tray and distillation tray are "coupled" by a continuous liquid level between the two. A reaction tray, containing the appropriate catalyst, is situated directly below a distillation tray. A vapor riser is provided through the reaction tray as a by-pass which carries the vapor from below, e.g. from a lower distillation tray to a vapor distribution area underneath the "coupled" distillation tray. Liquid flows downward through a downcomer, (e.g. from the next higher "uncoupled" distillation tray, the next higher "coupled" reaction tray/distillation tray or even a feed or recycle stream) by-passing the "coupled" distillation tray, and onto and across the "coupled" reaction tray immersing the catalyst, and rises upward through the catalyst bed and to and across the "coupled" distillation tray where it is intimately contacted with the rising vapor effecting fractional distillation. Only that vapor produced by the reaction on the reaction tray rises through the catalyst, minimizing catalyst movement and vapor pressure drop while the heat produced contributes to the distillation. A sufficient vertical distance between the two "coupled" trays is provided to allow disengagement of any catalyst particles which might become entrained in the rising liquid. If the boil up on the reaction tray (caused by the heat of reaction) causes too much turbulence, a screen may be required to retain solid catalyst particles which become entrained in the upward flowing liquid.

The liquid from the "coupled" distillation tray flows over a weir and down a downcomer to the reaction tray of the next lower "coupled" pair, a lower standard distillation tray in the column or into the bottoms of the column. Similarly, the vapor from the "coupled" distillation tray could ascend to a higher standard distillation tray, coupled reaction tray/distillation tray pair or into the overheads.

The advantages of the present invention over other proposed methods and systems include:

(1) Minimum movement of the catalyst particles resulting in lower attrition;

(2) The vapor generated by the reaction flows concurrently upward with the liquid flow and does not restrict liquid flow;

(3) The major portion of the vapor in the distillation does not flow through the catalyst bed, reducing pressure drop to near that of standard distillation equipment;

(4) The catalyst bed is almost completely liquid full (excepting the vapor produced therein), thus maximizing the use of the catalyst volume for the reaction;

(5) Because the distillation tray is conventional the distillation efficiency can be predicted with accuracy;

(6) The reaction kinetics may be predicted with accuracy because the residence time of the liquid in the bed is known;

(7) The size and depth of catalyst beds can be designed to provide the optimum degree of reaction for any particular location in the column;

(8) Existing distillation columns may be easily converted by removing existing trays and using the existing tray support rings; and (9) Catalyst can be removed from any reaction tray in the column when it becomes spent, or for any other reason, by withdrawing it as a solid-liquid slurry to an external settling chamber, from the which the liquid is returned to the same part of the column as described in my co-pending U.S. application Ser. No. 07/362,494, without the necessity of shutting down operations. Similarly, fresh catalyst or used catalyst can be charged onto the reaction trays by the same system. In fact, catalyst can be moved from one reaction tray to another if necessary to re-distribute the reaction profile in the column.

DESCRIPTION OF THE PREFERRED EMBODIMENTS

For a detailed description of the preferred embodiments the reader is referred to the attached figures wherein like components are given like numbers for ease of reference.

Figure 1:
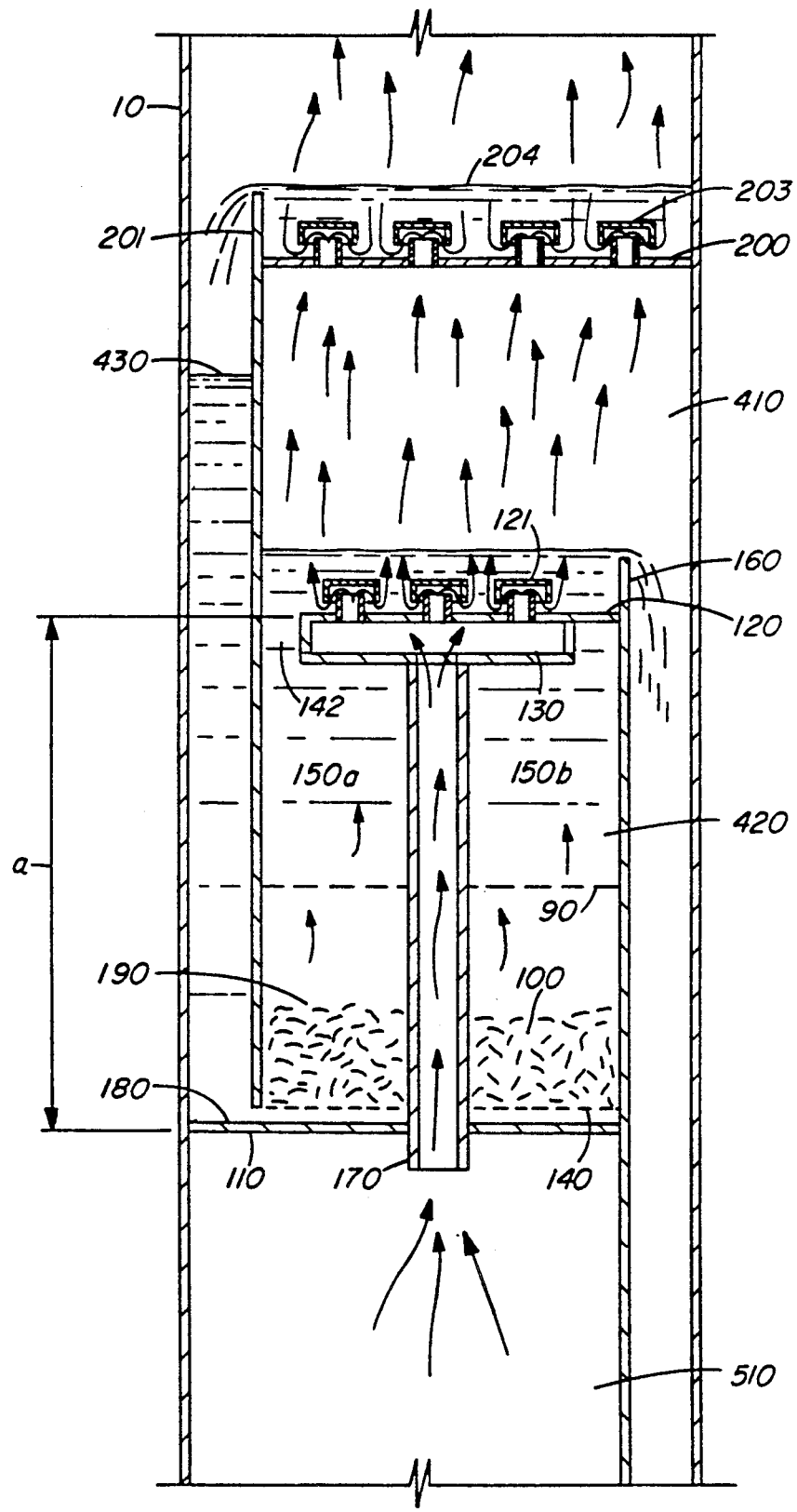
FIG. 1 is a side elevational view in cross section of a portion of a distillation column reactor depicting the "coupled" trays of the present invention.

Referring first to FIG. 1, there is illustrated the "coupled" reaction tray 110 and distillation tray 120 in a suitable pressure vessel 10. The small arrows indicate vapor flow upward in the vessel. Above the "coupled" trays 110 and 120 is a standard distillation tray 200 which is shown to have bubble caps 203 for vapor liquid contact and a weir 201 to maintain a liquid level on the tray 200. Downcomer 150a provides fluid communication from standard distillation tray 200 around "coupled" distillation tray 120 to downcomer area 180 on reaction tray 110.

Supported on or directly above reaction tray 110 is the selected particulate catalyst 100 for the particular reaction. The catalyst 100 may be loosely supported on the tray 110 but preferably is spaced above the tray 110 between downcomers 150a and 150b by a screen 140. The "coupled" distillation tray 120 is located a vertical distance a above reaction tray 110 to provide sufficient space 420 for disengagement of any catalyst particles which may become entrained in the liquid. A liquid upcomer area 142 is provided between the distillation tray 120 and downcomer 150a to allow liquid from the reaction tray 110 to flow up and onto the distillation tray 120. Vapor riser 170 passes through or past reaction tray 110 and provides fluid communication between the vapor 510 in the lower portion of the column, e.g. from above lower distillation tray (not shown) to vapor distribution area 130 on the underside of distillation tray 120. Vapor distribution area 130 distributes the vapor evenly across the underside of distillation tray 120 before it passes upward through the bubble caps 121 or similar means for contact with the liquid on the tray 120.

Weir 160 maintains a liquid level on the distillation tray 120 which is continuous with the liquid on reaction tray 110. Thus the two trays are "coupled" by a continuous liquid level between the two.

Downcomer 150b is provided to carry liquid from distillation tray 120 downward to the next lower "coupled" reaction tray/distillation tray pair (not shown), a standard distillation tray (not shown) or column bottoms (not shown). The downcomer 150b provides a liquid by-pass around reaction tray 110 similar to the vapor by-pass provided by vapor riser 170.

Figure 2:
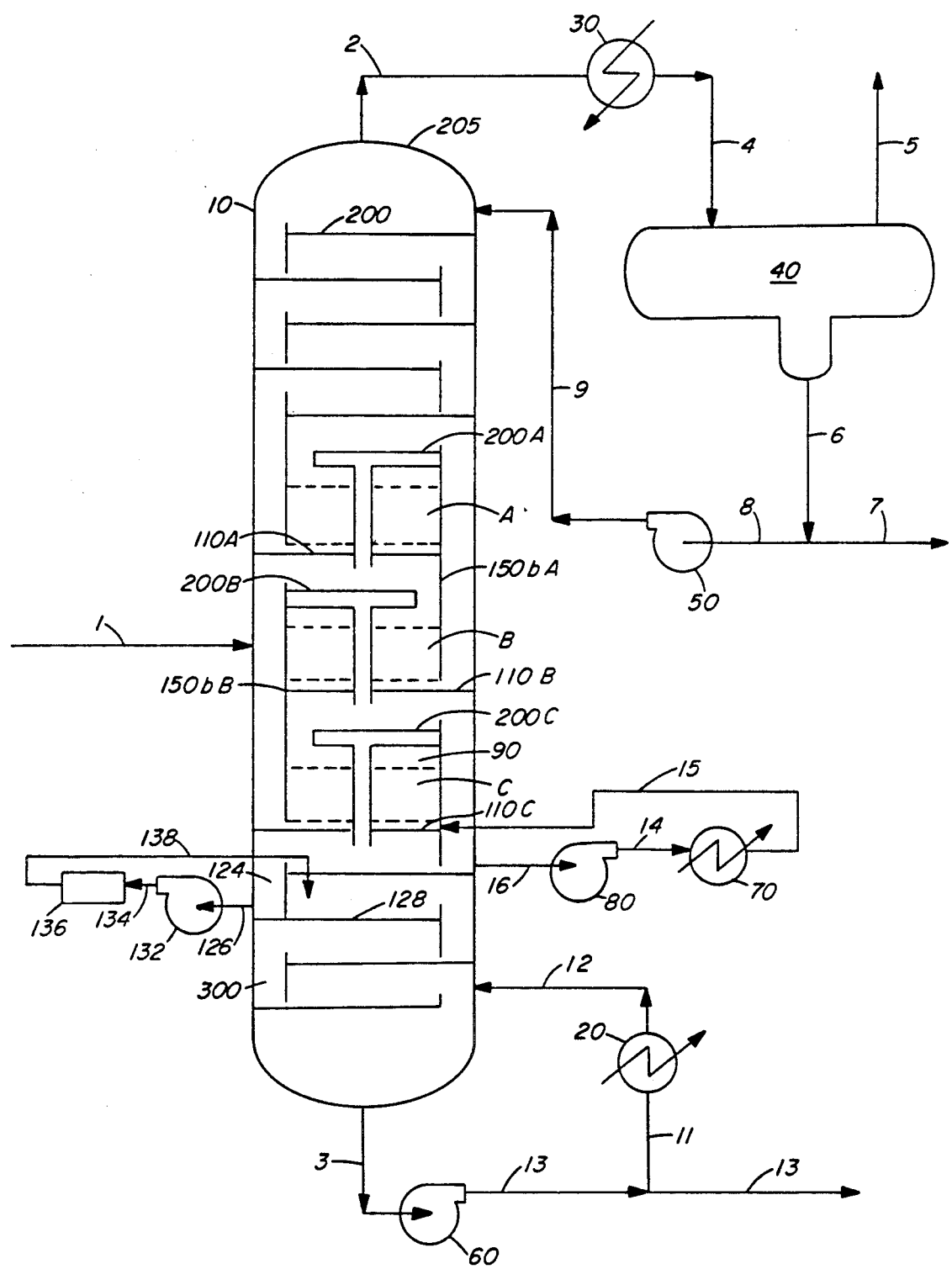
FIG. 2 is a side elevational view of a distillation column reactor utilizing the "coupled" trays of the invention with associated equipment shown in schematic form.

The relationship of multiple "coupled" reaction tray/distillation tray pairs may be more easily understood with reference to FIG. 2 which is in semi-schematic form showing a typical catalytic distillation reactor employing the present invention. There is shown a suitable vertical vessel 10 such as is commonly used for distillation columns having standard distillation trays in the top and bottom generally indicated at 200 and 300 respectively.

In the middle of the vessel 10 are illustrated three "coupled" reaction tray/distillation tray pairs indicated at A, B and C. Each of the "coupled" pairs contains each element as shown in FIG. 1 and described above.

The vessel is provided with a feed inlet 1 which may be more than one line depending upon the reactants for the desired reaction. For example, in the manufacture of MTBE from isobutene and methanol, the methanol may be fed at or near the top and isobutene at or near the bottom. An overhead vapor line 2 and liquid bottoms line 3 are also provided.

A condenser 30 is in fluid communication with the vapor space 205 above the top distillation tray in vessel 10 by overhead vapor line 2. The condenser 30 may partially or totally condense the overhead vapors as desired or required by the particular process. An overhead accumulator 40 is connected in fluid communication with condenser 30 by flow line 4 to collect the condensed overhead liquid. In the event that the condenser 30 is a partial condenser, a vapor line 5 is provided to carry away the uncondensed vapors to a desired location.

Flow line 6 is provided to withdraw condensed overhead liquids from accumulator 40. The withdrawn liquid may be split into overhead product and removed via flow line 7 or returned to the distillation column reactor as reflux via flow line 8, pump 50 and flow line 9 connected to the vapor space 205 above the top tray in vessel 10.

Flow line 3 is provided to withdraw liquid bottoms from vessel 10 and provide suction to liquid bottoms pump 60 which discharges into flow line 17. A portion of the bottoms may be split into flow line 11 and 13 with line 13 carrying the bottoms product to storage or further processing as desired. The portion of bottoms in line 11 may be heated in reboiler 20 to provide the necessary additional heat for the distillation and returned to the bottom of vessel 10 by flow line 12.

Thus the liquid down flow from "coupled" tray pairs A flows from distillation tray 200A via downcomer 150bA onto reaction tray 110B where it passes upward through the catalyst bed in "coupled" tray pair B to distillation tray 200B, down downcomer 150bB onto reaction tray 110C and repeating the sequence again through "coupled" tray pair C. Thus it can be seen that if more than one "coupled" pairs of reaction and distillation trays are provided in the vessel, the next lower "coupled" reaction tray would be the second reaction tray below the distillation tray to which the downcomer 150b is connected.

A convenient means to provide the pressure required to pass the liquid through the screen 140 and catalyst bed is supplied by allowing the liquid level in the downcomer 150a to back up sufficiently to provide the required pressure gradient. Since the liquid flow rate per unit area of the catalyst bed is normally quite low, the pressure drop is not excessive and can be provided by a reasonable height of liquid in the downcomer.

Since the catalyst particles are only minimally fluidized according to the present invention, the top of the catalyst bed forms a relatively level surface. Vapor bubbles leaving this surface 190 will cause only minor localized disruptions and the catalyst particles will quickly settle back into the bed. However, if significant vaporization of the reacting liquid occurs as a result of exothermic heat of reaction, the vapor bubbles leaving the catalyst surface can cause turbulence which may tend to entrain some catalyst particles. In that case a screen 90 may be provided above the bed to retain the solid particles and allow the liquid and vapor to pass through. The entrained particles are to be distinguished from the expanded catalyst bed, caused and maintained by the liquid flow, since the entrained particles constitute only a small and inconsequential amount of the total catalyst volume in the reaction zone. Even with the minimal turbulence obtaining in the present process (compared to a vapor fluidized system), there may be attrition of the catalyst. The resulting catalyst fines may be very susceptible to entrainment and removal from the expanded catalyst bed. The screen (or screens, since there may be more than one, e.g. of finer mesh toward the distillation tray) are desirable to prevent stray catalyst material from leaving the reaction zone.

Preferably the turbulence of the catalyst on the tray produces an expanded bed which is sufficient to only separate the particles and reduce the pressure drop through the bed. The expanded volume of the catalyst should be less than 2 and preferably less than 1.75 times the settled volume. Most preferably the fluidized volume of the catalyst is less than 1.50 times the settled volume.

The retaining screen described above may be placed at any height below the couple distillation tray within the reaction zone, preferably above the expanded catalyst be height, i.e., the screen is preferably used only to keep stray catalyst particles from reaching the coupled distillation tray. In some instances, however, when the screen is positioned above the catalyst containing tray at a height of less than 2 times the settled height of the catalyst, the volume of the expanded bed may be (but not necessarily, since the expanded catalyst be may comprise a smaller volume) defined by the volume between the catalyst tray and the screen.

If desired, any number of pump arounds may be provided at desired trays to add or remove heat as necessary to balance the column. One such pump around is shown on "coupled" trays C. Pump 80 takes suction through line 16 from the liquid leaving the "coupled" distillation tray of C and passes the liquid via line 14 to heat exchanger 70 which is shown in the example as cooling the liquid which is returned via flow line 15 to the liquid entering the "coupled" reaction tray of C. With addition of pump arounds more precise control of the reaction and distillation may be achieved. As an alternative to pump arounds cooling or heating coils may be placed within the liquid between the "coupled" trays or in the downcomer.

The loading and unloading of the catalyst 100 onto and from the reaction trays may be conveniently accomplished by the method described in my co-pending patent application Ser. No. 07/362,494, which is incorporated herein. The catalyst particles are generally used in a granular size of about 0.25 to 1 mm, although particles from 0.15 mm up to about 2 mm may be employed. The finer catalysts provide high surface area, but also result in high pressure drops through the reactor. The catalyst particle size and density, depth of the settled bed, the liquid flow rate and liquid density are factors in determining the volume of the expanded bed. As discussed above the vapor produced in the reaction zone is a another consideration, particularly with the smaller particles.

Notwithstanding the retention screens 90 disclosed above, some amount of catalyst fines may be produced which escape through the screens. A preferred embodiment of the present invention which will work in the present invention or in any other distillation process wherein catalyst fines may be present, is shown in FIG. 2 in section 300 of the column. The downcomer 124 on to the conventional distillation tray 128 is closed. All of the liquid entering downcomer 124 is pumped via line 126, pump 132 and line 134 through filter 136 and hence via line 138 on to the tray 128. This system is located below a coupled set of tray as described above and preferably below the lowest coupled set of trays in the column. The filter may comprise a plurality of fine screens or any other material which will retain the fines and allow the liquid to pass. There may be two filters connected in parallel to allow for continuous use of one filter while the other is cleaned, for example by backwash (not shown).

While the distillation trays have been shown to have bubble caps as the vapor-liquid contacting structure, any other suitable structure may be used, such as sieve trays, valve trays, simple vapor distributors, and the like. The sizing of the various vessels and trays are dependent upon the individual reaction conditions and separation desired and are within the expertise of those skilled in the art of reactor and distillation column design. Consequently, most of the equipment associated with a distillation column reactor, such as control valves, temperature controllers, flow controllers, level controllers and pressure controllers have been omitted. The materials of construction may easily be selected by those skilled in the art according to reactants, products and conditions.

Additionally, while the "coupled" trays are shown to be sequential in FIG. 2, standard distillation trays may be disposed between the "coupled" trays.

The invention claimed is:

1. A distillation column reactor for carrying out catalytic distillation, comprising in combination:
   (a) a vessel suitable for concurrently carrying out reactions and fractional distillation;
   (b) at least one reaction tray horizontally disposed and supported within said vessel, said reaction tray having a first liquid downcomer disposed above said reaction tray and a downcomer area to receive a liquid from above; said reaction tray suitable for supporting particulate catalyst immersed within liquid on said reaction tray;

(c) a vapor riser through said reaction tray and in fluid communication with;

(d) an associated vapor-liquid contacting means disposed above and coupled with said reaction tray, said associated vapor-liquid contacting means comprising,
   (i) a liquid upcomer area to receive a liquid from said reaction tray,
   (ii) a gas distribution chamber below said vapor-liquid contacting means in fluid communication with said vapor riser,
   (iii) a gas-liquid contact means on said vapor-liquid contacting means to promote fractional distillation on said vapor-liquid contacting means, and
   (iv) an overflow weir to maintain a liquid level on said associated vapor-liquid contacting means; and (e) a second liquid downcomer extending from said associated vapor-liquid contacting means to allow passage of a liquid thereon downward in said vessel by-passing said reaction tray.

2. The distillation column reactor of claim 1 wherein said associated vapor-liquid contacting means comprises a distillation tray.

3. The distillation column reactor of claim 2 wherein there is a plurality of each of said coupled reaction trays and associated distillation trays vertically arranged alternatingly in said vessel such that the liquid from each of said associated distillation trays passes downward in said vessel to the second reaction tray below each of said distillation trays.

4. The distillation column reactor of claim 3 further comprising distillation trays above, below, or interposed between said plurality of coupled reaction trays and associated distillation trays within said vessel.

5. The distillation column reaction of claim 2 wherein the vertical distance between said coupled reaction tray and said associated distillation tray is sufficient to allow separation of a liquid and any particulate catalyst entrained therein before said liquid enters said distillation tray.

6. The distillation column reactor of claim 2 wherein the upward flow of a liquid across said reaction tray and up and over said weir is provided by a hydraulic head in said downcomer.

7. The distillation column reactor of claim 2 further comprising an external heat exchanger in fluid communication with the said second downcomer for adding or removing heat to or from a liquid therein.

8. The distillation column reactor of claim 2 further comprising an external heat exchanger within said distillation column reactor for adding or removing heat to or from a liquid therein.

9. The distillation column reactor of claim 2 wherein means is provided to space said particulate catalyst above and away from said reaction tray.

10. The distillation column reactor of claim 9 wherein said means to space comprises a screen positioned between said reaction tray and said particulate catalyst.

11. The distillation column reactor of claim 3 further comprising a distillation tray below each of said plurality of coupled reaction trays and associated distillation trays within said vessel comprising a closed downcomer to said distillation tray, a flow line connecting said closed downcomer to a filter external of said distillation column reactor and a flow line from said filter onto said distillation tray.

12. A distillation column reactor for carrying out catalytic distillation, comprising in combination:

(a) a vessel suitable for concurrently carrying out reactions and fractional distillation;

(b) a plurality of reaction trays disposed within said vessel, each of said reaction trays having a downcomer area to receive liquid from above said reaction tray within said vessel and a vapor riser through each of said reaction trays;

(c) particulate catalyst supported by catalyst support means above each of said reaction trays such as to be immersed within the liquid on each of said reaction trays, said catalyst being selected for the desired reaction;

(d) a plurality of associated distillation trays, one each of said distillation trays disposed directly above each of said reaction trays and catalyst within said vessel, each of said associated distillation trays comprising,
   (i) a liquid upcomer area to receive liquid from the reaction tray directly below coupling each of said associated distillation trays with the reaction tray disposed directly below with liquid,
   (ii) a gas distribution chamber below said associated distillation tray in fluid communication with the gas vapor riser through the reaction tray directly below,
   (iii) a gas-liquid contact means on said associated distillation tray to promote fractional distillation on said associated distillation tray, and
   (iv) an overflow weir to maintain a liquid level on said associated distillation tray;
   (v) each of said associated distillation trays being coupled to the reaction tray directly below by said fluid communication between said gas chamber and said vapor riser;

(e) a downcomer from each of said associated distillation trays in fluid communication with the downcomer area of the second reaction tray below each of said associated distillation trays to allow passage of the liquid thereon downward in said vessel bypassing the reaction tray directly below each of said associated distillation trays; and (f) a plurality off distillation trays disposed above and below said plurality of reaction trays and said associated distillation trays within said vessel.

13. The distillation column reactor of claim 12 further comprising external heat exchangers in fluid communication with the liquid on selected reaction trays or distillation trays to add or remove heat to or from said liquid.

14. The distillation column reactor of claim 13 wherein one of said heat exchangers is a reboiler to supply heat to the liquid in the bottom of said reactor.

15. The distillation column reactor of claim 14 further comprising an external condenser in fluid communication with the vapor space above the top distillation tray to condense or partially condense the vapor from said vessel.

16. The distillation column reactor of claim 15 further comprising an accumulator in fluid communication with said condenser to collect the condensed vapors, and a reflux conduit for returning a portion of said condensed vapor from said accumulator to said vessel.

17. The distillation column reactor of claim 12 further comprising distillation trays disposed between said coupled trays.

18. A system for removing fines from a catalyst reactor- distillation column reactor having a catalyst section therein comprising a distillation tray below said catalyst section within said distillation column reactor comprising a closed downcomer to said distillation tray, a flow line connecting said closed downcomer to a filter and a flow line from said filter onto said distillation tray.

19. A unit for disposition within a reaction distillation column, comprising:
 (a) at least one reaction tray having a liquid downcomer and downcomer area to receive liquid from above and a gas by-pass through said reaction tray; said reaction tray for supporting particulate catalyst immersed within liquid on said reaction tray;
 (b) at least one vapor-liquid contacting means disposed above said reaction tray and catalyst within said vessel, said vapor-liquid contacting means comprising,
  (i) a liquid upcomer area to receive liquid from said reaction tray,
  (ii) a gas distribution chamber below said vapor-liquid contacting means in fluid communication with said gas by-pass,
  (iii) a gas-liquid contact means on said vapor-liquid contacting means to promote fractional distillation on said vapor-liquid contacting means, and
  (iv) an overflow weir to maintain a liquid level on said vapor-liquid contacting means; and
 (c) a downcomer from said vapor-liquid contacting means to allow passage of the liquid thereon downward in said vessel by-passing said reaction tray.

* * * * *